(12) United States Patent
De Montmorillon et al.

(10) Patent No.: US 6,895,153 B2
(45) Date of Patent: May 17, 2005

(54) OPTICAL FIBER FOR WAVELENGTH DIVISION MULTIPLEX TRANSMISSION NETWORKS

(75) Inventors: Louis-Anne De Montmorillon, Paris (FR); Pierre Sillard, Le Chesnay (FR); Lionel Expert, Paris (FR); Denis Molin, Le Chesnay (FR); Ludovic Fleury, Bois D'Arcy (FR); Bruno Dany, Maisons Laffitte (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/740,456

(22) Filed: Dec. 22, 2003

(65) Prior Publication Data

US 2004/0131323 A1 Jul. 8, 2004

(30) Foreign Application Priority Data

Dec. 24, 2002 (FR) .............................. 02 16614

(51) Int. Cl.$^7$ .............................. G02B 6/02; G02B 6/18
(52) U.S. Cl. .................. 385/124; 385/123; 385/125; 385/126
(58) Field of Search .................. 385/100, 123–126

(56) References Cited

U.S. PATENT DOCUMENTS

| | | | |
|---|---|---|---|
| 5,905,838 A | | 5/1999 | Judy et al. |
| 6,535,676 B1 | * | 3/2003 | de Montmorillon et al. ............ 385/123 |
| 6,577,800 B2 | * | 6/2003 | Sarchi et al. .......... 385/123 |

FOREIGN PATENT DOCUMENTS

| | | | |
|---|---|---|---|
| EP | 1 018 656 A1 | 7/2000 | |
| EP | 1 103 830 A1 | 5/2001 | |
| EP | 1 211 533 A2 | 6/2002 | |
| EP | 1 279 648 A2 | 1/2003 | |
| EP | 1279648 A2 * | 1/2003 | ......... C03B/37/018 |
| EP | 1 288 685 A1 | 3/2003 | |
| EP | 1 291 688 A2 | 3/2003 | |

OTHER PUBLICATIONS

Liu Y et al: "Design and Fabrication of Locally Dispersion-Flattened Large Effective Area Fibers" Proceedings of the European Conference on Optical COmmunication, XX, XX, vol. 1, Spetember 20, 1998, pp. 37–38, XP000879650.*

Liu Y et al: "Design and Fabrication of Locally Dispersion-Flattened Large Effective Area Fibers" Proceedings of the European Conference on Optical Communication, XX, XX, vol. 1, Sep. 20, 1998, pp. 37–38, XP000879650.

* cited by examiner

Primary Examiner—Brian Healy
Assistant Examiner—Derek L. Dupuis
(74) Attorney, Agent, or Firm—Sughrue Mion, PLLC

(57) ABSTRACT

An optical fiber has three or four core slices including one or more buried slices and a raised central slice. The buried slice or each of the buried slices is very deeply buried. The fiber has a zero dispersion wavelength of less than 1 460 nm. It has a chromatic dispersion in the vicinity of 5 ps/nm.km and a dispersion slope in the vicinity of 0.03 ps/nm$^2$.km at a wavelength of 1 550 nm.

17 Claims, 4 Drawing Sheets

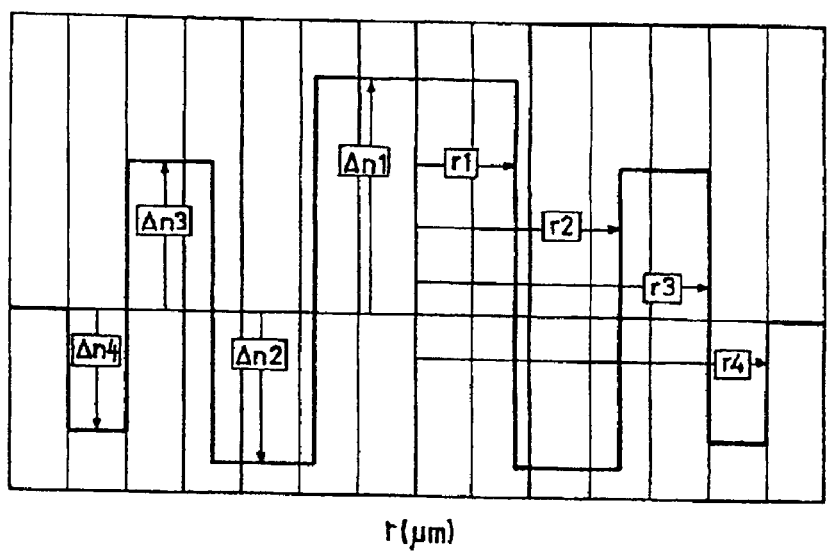
FIG_1

FIG_2

| Ex | $r_1$ μm | $r_2$ μm | $r_3$ μm | $r_4$ μm | $\Delta n_1$ | $\Delta n_2$ | $\Delta n_3$ | $\Delta n_4$ | $|\Delta n_2|/\Delta n_1$ | $|\Delta n_4|/\Delta n_1$ | $|\Delta n_2+\Delta n_4|/\Delta n_1$ |
|----|------|------|-------|-------|------|------|------|------|------|------|------|
| 1 | 3.65 | 5.48 | 10.00 |       | 7.20 | -5.80 | 2.30 |       | 0.81 |      |      |
| 2 | 3.61 | 5.98 | 8.68  |       | 7.23 | -5.00 | 4.08 |       | 0.69 |      |      |
| 3 | 3.69 | 5.96 | 8.54  |       | 7.17 | -6.00 | 4.50 |       | 0.84 |      |      |
| 4 | 3.67 | 5.65 | 9.18  |       | 7.19 | -6.00 | 3.00 |       | 0.83 |      |      |
| 5 | 3.62 | 5.60 | 9.73  |       | 7.24 | -5.40 | 2.50 |       | 0.75 |      |      |
| 6 | 3.66 | 5.55 | 9.84  |       | 7.20 | -5.80 | 2.50 |       | 0.81 |      |      |
| 7 | 3.78 | 5.71 | 11.60 | 17.00 | 6.74 | -6.00 | 2.30 | -2.06 | 0.89 | 0.31 | 1.20 |
| 8 | 3.69 | 5.24 | 13.80 | 17.60 | 6.89 | -6.00 | 1.50 | -2.50 | 0.87 | 0.36 | 1.23 |
| 9 | 3.70 | 5.25 | 14.00 | 17.50 | 6.85 | -6.00 | 1.50 | -3.00 | 0.88 | 0.44 | 1.31 |
| 10 | 3.73 | 5.43 | 13.00 | 17.60 | 6.86 | -6.00 | 1.80 | -3.00 | 0.87 | 0.44 | 1.31 |
| 11 | 3.65 | 5.11 | 14.60 | 17.00 | 6.92 | -6.00 | 1.30 | -3.20 | 0.87 | 0.46 | 1.33 |
| 12 | 3.62 | 5.28 | 13.80 | 17.50 | 7.07 | -5.80 | 1.52 | -3.02 | 0.82 | 0.43 | 1.25 |
| 13 | 3.71 | 5.15 | 13.90 | 17.50 | 6.81 | -5.80 | 1.48 | -3.01 | 0.85 | 0.44 | 1.29 |
| 14 | 3.83 | 5.43 | 14.60 | 17.60 | 6.71 | -5.80 | 1.77 | -2.93 | 0.86 | 0.44 | 1.30 |
| 15 | 3.40 | 6.01 | 12.70 | 17.50 | 7.18 | -2.80 | 1.70 | -1.30 | 0.39 | 0.18 | 0.57 |
| 16 | 3.43 | 5.53 | 13.84 | 17.49 | 7.12 | -2.80 | 1.40 | -1.55 | 0.39 | 0.22 | 0.61 |
| 17 | 3.31 | 5.84 | 13.93 | 17.54 | 7.44 | -2.80 | 1.45 | -1.55 | 0.38 | 0.21 | 0.58 |
| 18 | 3.52 | 5.90 | 14.64 | 17.65 | 6.95 | -2.80 | 1.64 | -1.38 | 0.40 | 0.20 | 0.60 |
| 19 | 3.47 | 6.35 | 8.65  |       | 7.43 | -4.00 | 4.50 |       | 0.54 |      |      |

FIG_3

| Example | $\lambda_{Cth}$ | $\lambda_{Ceff}$ | $\lambda_{CC}$ | $\lambda_0$ | Dispersion C | | | Slope C' |
|---|---|---|---|---|---|---|---|---|
| | | | | | 1460nm | 1550nm | 1625nm | 1550nm |
| | nm | | | nm | ps/(nm.km) | | | ps/(nm².km) |
| N°1 | 1770 | 1400 | <1260 | 1390 | 2.4 | 5.0 | 7.2 | 0.028 |
| N°2 | 1730 | 1450 | <1260 | 1400 | 2.2 | 5.0 | 7.3 | 0.030 |
| N°3 | 1730 | 1470 | <1260 | 1390 | 2.6 | 5.1 | 7.3 | 0.027 |
| N°4 | 1740 | 1410 | <1260 | 1390 | 2.5 | 5.1 | 7.3 | 0.028 |
| N°5 | 1760 | 1400 | <1260 | 1390 | 2.5 | 5.0 | 7.2 | 0.027 |
| N°6 | 1780 | 1430 | <1260 | 1390 | 2.4 | 4.9 | 7.1 | 0.027 |
| N°7 | 1600 | 1450 | <1260 | 1380 | 2.6 | 5.2 | 7.6 | 0.029 |
| N°8 | 1640 | 1400 | <1260 | 1400 | 2.3 | 4.9 | 7.2 | 0.028 |
| N°9 | 1640 | 1400 | <1260 | 1400 | 2.3 | 4.9 | 7.2 | 0.029 |
| N°10 | 1610 | 1450 | <1260 | 1390 | 2.4 | 5.1 | 7.4 | 0.029 |
| N°11 | 1640 | 1330 | <1260 | 1400 | 2.2 | 4.9 | 7.2 | 0.029 |
| N°12 | 1610 | 1390 | <1260 | 1400 | 2.2 | 4.6 | 6.6 | 0.025 |
| N°13 | 1630 | 1400 | <1260 | 1400 | 2.3 | 5.4 | 8.2 | 0.035 |
| N°14 | 1960 | 1650 | <1450 | 1390 | 2.6 | 5.1 | 7.3 | 0.027 |
| N°15 | 1640 | 1390 | <1260 | 1400 | 2.3 | 5.1 | 7.3 | 0.029 |
| N°16 | 1710 | 1390 | <1260 | 1410 | 2.1 | 5.4 | 8.1 | 0.035 |
| N°17 | 1710 | 1390 | <1260 | 1400 | 2.0 | 4.5 | 6.4 | 0.025 |
| N°18 | 2090 | 1650 | <1450 | 1400 | 2.4 | 5.0 | 7.1 | 0.027 |
| N°19 | 1740 | 1420 | <1260 | 1390 | 2.5 | 5.0 | 7.0 | 0.026 |

FIG_4

| Example | $2W_{02}$ | $S_{eff}$ | PPCφ20mm | | | Sµc |
|---|---|---|---|---|---|---|
| | | | 1550 nm | 1625 nm | 1675 nm | |
| | µm | µm² | dB/m | | | |
| N°1 | 8.18 | 53.6 | <10 | <50 | <120 | 0.6 |
| N°2 | 8.20 | 54.2 | <10 | <40 | <100 | 0.6 |
| N°3 | 8.14 | 54.2 | <10 | <50 | <120 | 0.6 |
| N°4 | 8.15 | 53.6 | <10 | <50 | <100 | 0.6 |
| N°5 | 8.15 | 53.2 | <10 | <50 | <100 | 0.6 |
| N°6 | 8.18 | 53.8 | <10 | <50 | <100 | 0.6 |
| N°7 | 8.39 | 57.1 | <20 | <50 | <100 | 0.9 |
| N°8 | 8.38 | 55.8 | <20 | <50 | <120 | 0.8 |
| N°9 | 8.40 | 56.2 | <20 | <50 | <120 | 0.9 |
| N°10 | 8.37 | 56.2 | <10 | <40 | <80 | 0.8 |
| N°11 | 8.36 | 55.3 | <20 | <70 | <160 | 0.9 |
| N°12 | 8.21 | 53.6 | <10 | <40 | <100 | 0.8 |
| N°13 | 8.56 | 58.0 | <20 | <40 | <100 | 0.8 |
| N°14 | 8.64 | 59.8 | <20 | <60 | <140 | 0.8 |
| N°15 | 8.29 | 53.6 | <20 | <50 | <120 | 0.7 |
| N°16 | 8.49 | 55.9 | <20 | <50 | <120 | 0.7 |
| N°17 | 8.11 | 51.1 | <20 | <50 | <120 | 0.7 |
| N°18 | 8.57 | 57.4 | <30 | <100 | <200 | 0.8 |
| N°19 | 8.01 | 51.3 | <10 | <40 | <100 | 0.6 |

OPTICAL FIBER FOR WAVELENGTH DIVISION MULTIPLEX TRANSMISSION NETWORKS

CROSS-REFERENCE TO RELATED APPLICATIONS

This application is based on French Patent Application No. 02 16 614 filed Dec. 24, 2002, the disclosure of which is hereby incorporated by reference thereto in its entirety, and the priority of which is hereby claimed under 35 U.S.C. §119.

BACKGROUND OF THE INVENTION

1. Field of the Invention

The invention relates to the field of optical fibers for wavelength division multiplex (WDM) transmission networks. The WDM transmission networks referred to are more particularly networks known as "metropolitan area networks". The transmission distances in metropolitan area networks are typically from a few kilometers, for example 10 km, to approximately 300 km.

2. Description of the Prior Art

The invention aims to provide an optical fiber for use in the above type of network embodying a very good compromise that principally encompasses, for the transmission distance concerned, non-linear effect constraints leading to distortion in the signal conveyed, signal loss constraints leading to attenuation of the signal conveyed, and constraints associated with the cost of production of the optical fiber concerned and the transmission system as a whole. To be more precise, the invention aims to provide a relatively simple optical fiber that is inexpensive to produce, has a high effective area, typically greater than 50 $\mu m^2$ at the wavelength of 1,550 nm, thereby diminishing the impact of non-linear effects, and is usable over the greatest possible portion of the combination of bands S. C and L, respectively extending from 1,460 nm to 1,520 nm, from 1,520 nm to 1,565 nm, and from 1,565 nm to 1,625 nm. The invention also aims to provide an optical fiber that is monomode in bands S, C and L, and which has good resistance to non-linear effects in those bands of the spectrum. The invention further aims to provide an optical fiber that can be used even in a transmission system with no means of compensating the chromatic dispersion of said optical fiber. Over most of the combination of bands S, C and L, and preferably over the whole of all three bands S, C and L, the chromatic dispersion must remain sufficiently low to necessitate no compensation of chromatic dispersion and sufficiently high to induce no non-linear effects significantly degrading transmission. In a preferred embodiment, the invention aims to provide a simple optical fiber that is inexpensive to produce, has an effective area greater than 50 $\mu m^2$ at the wavelength of 1,550 nm, and a dispersion from 2 to 9 ps/(nm*km) over a range of wavelengths from 1,460 nm to 1,625nm, combined with acceptable bending losses. Acceptable bending losses are advantageously below 100 dB/m for a diameter of 20 mm at a wavelength of 1,625 nm and below 30 dB/m for a diameter of 20 mm at a wavelength of 1,550 nm.

Thus the invention aims to provide a monomode optical fiber that can be used over a wide range of the spectrum, minimizes non-linear effects, does not necessarily necessitate chromatic dispersion compensation when used in a metropolitan area network, and also has acceptable bending losses. To this end, the optical fiber according to the invention has an optimized narrow range of chromatic dispersion, a maximum dispersion slope threshold, a maximum chromatic dispersion to dispersion slope ratio threshold, and one or two claddings that are sufficiently deeply buried.

The optical fibers comprise a core of varying index profile and a cladding of constant index. The core comprises a plurality of slices that can have different shapes, in particular a rectangular, triangular, trapezoidal or alpha shape, and can further be truncated and/or include a pedestal. The invention aims to provide a simple optical fiber that is inexpensive to produce. To this end, the optical fiber according to the invention is restricted to three or four slices. A profile with three slices is the simplest in structural terms, but makes it obligatory to bury the only buried slice deeply, whereas, with the structurally less simple profile with four slices, each of the two buried slices can be either buried less deeply, with an equivalent effective area, or buried very deeply, with an increased effective area. The central slice is raised, in contrast to coaxial profiles which have a large central recess. Again with the aim of providing a simple optical fiber that is inexpensive to produce, according to the invention the dispersion slope chosen must not be too low, as otherwise the optical fiber becomes too costly to produce. The minimum dispersion slope threshold chosen is an important aspect of the invention, providing the opportunity to achieve the required compromise, which would otherwise be too difficult to achieve. A preferred minimum threshold slightly higher than the previous one facilitates the production of an optical fiber in accordance with the invention having optical properties comparable with those obtained close to the lowest minimum threshold.

The narrow chromatic dispersion range claimed, the narrow dispersion slope range claimed, the sufficiently deeply buried character of the buried slice or slices relative to the height of the central slice, the maximum zero dispersion wavelength threshold, and the limited number of slices, constitute essential features of the invention for achieving the good compromise that is required for optical fibers primarily intended to be used in a metropolitan area transmission system. Other optional preferred features further improve on said good compromise, in the direction of a very good compromise or even an excellent compromise.

None of the prior art cited and analyzed hereinafter has all the features of the invention or achieves an optimum compromise like that at which the invention is aimed.

Example 1 of French patent application FR 0002316 discloses an optical fiber that has in particular the disadvantage of a dispersion slope that is too low to achieve the required compromise, the unit cost of an optical fiber being inversely proportional to the dispersion slope for low values of the dispersion slope, and a very low dispersion slope leading to extreme sensitivity of the optical properties to even slight variations in the index profile of the optical fiber.

Example 4 in international patent application WO 02/14919 discloses an optical fiber which has in particular the disadvantages of a dispersion slope that is too high and buried layers that are insufficiently deeply buried to achieve the required compromise.

Example 1 of European patent application EP 1189082 discloses an optical fiber that has in particular the disadvantages of a dispersion slope that is too high and buried slices that are insufficiently deeply buried to achieve the required compromise.

Example 5 of European patent application EP 1189082 discloses an optical fiber that has in particular the drawbacks of a chromatic dispersion that is too low and buried slices that are insufficiently deeply buried to achieve the required compromise.

Example 10 and trial sample 3 of European patent application EP 1189082 disclose an optical fiber that has in particular the drawbacks of a dispersion slope that is too high, a chromatic dispersion that is too low, and buried slices that are insufficiently deeply buried to achieve the required compromise.

Comparative examples 4, 9, 10, 11 and 12 of European patent application EP 1211533 disclose an optical fiber that has in particular the drawbacks of a chromatic dispersion that is too high and buried slices that are insufficiently deeply buried to achieve the required compromise.

Example 18 of European patent application EP 1146358 discloses an optical fiber that has in particular the drawbacks of a chromatic dispersion that is too high and buried slices that are insufficiently deeply buried to achieve the required compromise.

Example 22 of European patent application EP 1146358 discloses an optical fiber that has in particular the drawbacks of buried slices that are insufficiently deeply buried to achieve the required compromise and bending losses significantly greater than those of the optical fiber according to the invention.

Examples 1 and 3 of European patent application EP 1130828 disclose an optical fiber that has in particular the drawback of an effective area at 1550 nm that is too low; moreover, no profile is specified.

Examples 2 and 4 of European patent application EP 1130828 disclose an optical fiber that has in particular the drawback of a dispersion slope that is too low; moreover, no profile is specified.

Examples 2 and 3 of European patent application EP 98117828.8 disclose an optical fiber that has in particular the drawback of buried slices that are insufficiently deeply buried to obtain the required compromise and appears to have bending losses significantly higher than those of the optical fiber according to the invention.

Example 4 of European patent application EP 98117828.8 disclose an optical fiber that has in particular the drawbacks of a chromatic dispersion that is too low and buried slices that are insufficiently deeply buried to achieve the required compromise.

Example 5 of European patent application EP 98117828.8 discloses an optical fiber that has in particular the drawbacks of a dispersion slope that is too high, a chromatic dispersion that is too low and buried slices that are insufficiently deeply buried to achieve the required compromise.

SUMMARY OF THE INVENTION

To achieve the required compromise, a first embodiment of the invention provides an optical fiber for wavelength division multiplex transmission networks, the fiber comprising, successively from its center toward its periphery, a core having a varying index profile and then a cladding having a constant index, the varying index profile of the core successively comprising, from the center toward the periphery, a central slice having a maximum index higher than the index of the cladding, a buried slice having a minimum index lower than the index of the cladding, and an annular slice having a maximum index higher than the index of the cladding and lower than the maximum index of the central slice, the ratio between the absolute value of the minimum index of the buried slice and the maximum index of the central slice being greater than 50%, the index of the central slice being at least 70% of the maximum index of the central slice at least one point less than 1 $\mu$m from the center of the optical fiber, the radii and the indices of each of the slices being determined so that the optical fiber has, on the one hand, at a wavelength of 1,550 nm, firstly, a chromatic dispersion from ps/(nm*km) to 6 ps/(nm*km), secondly, a dispersion slope from 0.02 ps/(nm$^2$*km) to 0.04 ps/(nm$^2$*km), and, thirdly a chromatic dispersion to dispersion slope ratio less than 240 nm, and, on the other hand, firstly, a zero dispersion wavelength less than 1,460 nm and, secondly, an in-cable cut-off wavelength less than 1,450 nm.

To improve the required compromise, in particular to increase the effective area of the optical fiber obtained without excessively degrading the simplicity and the fabrication cost of the optical fiber, the ratio between the absolute value of the minimum index of the buried slice and the maximum index of the central slice is from 60% to 90%.

To achieve the required compromise, a second embodiment of the invention provides an optical fiber for wavelength division multiplex transmission networks, the fiber comprising, successively from its center toward its periphery, a core having a varying index profile and then a cladding having a constant index, the varying index profile of the core successively comprising, from the center toward the periphery, a central slice having a maximum index higher than the index of the cladding, a first buried slice having a minimum index lower than the index of the cladding, an annular slice having a maximum index higher than the index of the cladding and lower than the maximum index of the central slice, and a second buried slice having a minimum index lower than the index of the cladding, the ratio between, firstly, the absolute value of the sum of the minimum index and the minimum index of the second buried slice and, secondly, the maximum index of the central slice being greater than 50%, the index of the central slice being at least 70% of the maximum index of the central slice at least one point less than 1 $\mu$m from the center of the optical fiber, the radii and the indices of each of the slices being determined so that the optical fiber has, on the one hand, at a wavelength of 1,550 nm, firstly, a chromatic dispersion from 4ps/(nm*km) to 6 ps/(nm*km), secondly, a dispersion slope from 0.02 ps/(nm$^2$*km) to 0.04 ps/(nm$^2$*km), and, thirdly a chromatic dispersion to dispersion slope ratio less than 240 nm, and, on the other hand, firstly, a zero dispersion wavelength less than 1,460 nm and, secondly, an in-cable cut-off wavelength less than 1,450 nm.

To improve the required compromise, in particular to increase the effective area of the optical fiber obtained without excessively degrading the simplicity and the fabrication cost of said optical fiber, the ratio between the absolute value of the minimum index of the first buried slice and the maximum index of the central slice is from 40% to 90%.

In the first and second embodiments, the in-cable cut-off wavelength, usually denoted $\lambda CC$, of the optical fiber obtained is made less than 1,450 nm so that the fiber can be a monomode fiber in bands S, C and L. To improve control of the in-cable cut-off wavelength, the maximum index of the annular slice is preferably lower than $3\times10^{-3}$ In a preferred embodiment, to be able to use the optical fiber according to the invention both as transmission optical fiber and as access optical fiber in the same system combining a metropolitan area transmission network and an access network, the radii and the indices of each of the slices are determined so that the optical fiber has an in-cable cut-off wavelength less than 1,260 nm. This preferred embodiment of the invention also relates to the combination, firstly, of a metropolitan area transmission network for a transmission distance less than 350 km and, secondly, an access network, respectively comprising transmission optical fibers and access optical fibers, wherein at least some of the transmission optical fibers and at least some of the access optical fibers are optical fibers whose in-cable cut-off wavelength is less than 1,260 nm. All the transmission optical fibers and all the access optical fibers are preferably optical fibers whose in-cable cut-off wavelength is less than 1,260 nm.

To improve the required compromise, making the optical fiber less costly to produce with virtually the same performance, the radii and the indices of each of the slices are preferably determined so that the optical fiber has a dispersion slope from 0.025 ps/(nm$^2$*km) to 0.035 ps/(nm$^2$*km) at the wavelength of 1,550 nm. The radii and the indices of each of the slices are advantageously determined so that the optical fiber has a chromatic dispersion from 4.5 ps/(nm*km) to 5.5 ps/(nm*km) at the wavelength of 1,550 nm.

For the optical fiber of the invention to be usable over the whole of the S band with low degradation caused by non-linear effects, the radii and the indices of each of the slices are preferably determined so that the optical fiber has a chromatic dispersion greater than 2 ps/(nm*km) at the wavelength of 1,460 nm.

In a preferred embodiment, the radii and the indices of each of the slices are determined so that the optical fiber has a zero dispersion wavelength from 1,375 nm to 1,415 nm, to obtain a dispersion in the vicinity of 5 ps/(nm*km) and a dispersion slope in the vicinity of 0.03 ps/(nm$^2$*km).

To simplify further the production of the optical fiber according to the invention, it is preferable for none of the slices to have a plurality of index, value plateaus as a function of the radius, that is to say, if the slices can have diverse shapes, for none of the slices to be staircase-shaped with a plurality of steps. It is preferable for all of the slices each to have only one plateau, although the transitions between plateaus can be inclined, however, i.e. not vertical.

The invention also relates to a transmission system for a transmission distance of less than 350 km, including at least one optical fiber according to the invention and having no means for compensating chromatic dispersion of the optical fiber. The usual chromatic dispersion compensation means include chromatic dispersion compensating optical fibers, whether in-module or in-cable, and can also take the form of optical components. The optical fiber according to the invention is preferably used in lengths exceeding 1 km. If the optical fiber according to the invention is nevertheless used with compensation means, for example a dispersion compensating optical fiber, only a short length of dispersion compensating optical fiber is required to compensate effectively the chromatic dispersion of the optical fiber according to the invention.

The invention will be better understood and other features and advantages will become apparent in the light of the following description and the appended drawings, which are provided by way of example.

BRIEF DESCRIPTION OF THE DRAWINGS

FIG. 1 shows diagrammatically one example of a type of profile With four slices of an optical fiber according to the invention, FIG. 2 is a table comprising radius and index difference values for nineteen examples of profiles with three or four slices of an optical fiber according to the invention.

FIG. 3 is a table comprising certain characteristics of profiles of an optical fiber according to the invention as defined in FIG. 2.

FIG. 4 is a table comprising other characteristics of profiles of an optical fiber according to the invention as defined in FIG. 2.

DETAILED DESCRIPTION OF THE PREFERRED EMBODIMENTS

FIG. 1 shows diagrammatically an example of a type of profile with four slices of an optical fiber according to the invention. The first slice, or central slice as it is otherwise known, has a maximum index difference Δn1 relative to the constant index of the cladding and an outside radius r1. The maximum index difference Δn1 is positive. The index is preferably constant between a zero radius and the radius r1. The second slice, or first buried slice as it is otherwise known, has a maximum index difference Δn2 relative to the constant index of the cladding and an outside radius r2. The maximum index difference Δn2 is negative. The index is preferably constant between the radius r1 and the radius r2. The third slice, or annular slice as it is otherwise known, has a maximum index difference Δn3 relative to the constant index of the cladding and an outside radius r3. The maximum index radius Δn3 is positive. The index is preferably constant between the radius r2 and the radius r3. The fourth slice, or second buried slice as it is otherwise known, has a maximum index difference Δn4 relative to the constant index of the cladding and an outside radius r4. The maximum index difference Δn4 is negative. The index is preferably constant between the radius r3 and the radius r4. Beyond the radius r4 is the constant index cladding.

FIG. 1 also represents an example of a type of profile with three slices of an optical fiber according to the invention if Δn4=0 and r4=r3. In this case there is no second buried slice and the first buried slice is simply referred to as the buried slice.

FIG. 2 is a table comprising radius and index difference values for nineteen examples (Ex) of profiles with three or four slices of an optical fiber according to the invention. The left-hand column gives the example numbers from 1 to 19. The next three or four columns give the radii in μm of the varying index profile of the core. The next three or four columns give one thousand times the index differences (no units). The next column gives the ratio between, firstly, the absolute value of the minimum index of the buried slice, or of the first buried slice if there are two and, secondly, the maximum index of the central slice. The next column gives the ratio between, firstly, the absolute value of the minimum index of the second buried slice, if there is one and, secondly, the maximum index of the central slice. The next column gives the ratio between, firstly, the absolute value of the sum of the minimum index of the first buried slice and the minimum index of the second buried slice and, secondly, the maximum index of the central slice.

FIG. 3 is a table of certain characteristics of the profiles of optical fibers in accordance with the invention as defined in FIG. 2. The left-hand column gives the example numbers from 1 to 19. For each example considered, the other columns give characteristics of the optical fiber corresponding to the example concerned. The next column gives the theoretical cut-off wavelength $\lambda_{eth}$ expressed in nm. The next column gives the effective cut-off wavelength $\lambda_{ceff}$ expressed in nm. The next column gives a maximum in-cable cut-off wavelength threshold λCC expressed in nm. The in-cable cut-off wavelength and the effective cut-off wavelength are defined in the ITU G.650 standard. The next three columns give the chromatic dispersion C expressed in ps/(nm*km) at the respective wavelengths of 1,460 nm, 1,550 nm and 1,625 nm. The next column gives the dispersion slope C' expressed in ps/(nm$^2$*km) at a wavelength of 1,550 nm.

FIG. 4 is a table of other characteristics of the profiles of optical fibers according to the invention as defined in FIG. 2. The left-hand column gives the numbers of the examples from 1 to 19. For each example concerned, the other columns give characteristics of the optical fiber corresponding to the example concerned. The next column gives the mode diameter $2W_{02}$ expressed in $\mu$m at the wavelength of 1,550 nm. The next column gives the effective area $S_{eff}$ expressed in $\mu m^2$ at the wavelength of 1,550 nm. The next three columns give the maximum bending loss threshold expressed in dB/m, with the optical fiber wound to a diameter of 20 mm, at the respective wavelengths of 1,550 nm, 1,625 nm and 1,675 nm. Given the low bending losses at 1,675 nm, the optical fibers according to the invention remain usable in the U band from 1,625 nm to 1,675 nm. The last column gives the sensitivity to microbending at a wavelength of 1,550 nm, relating to our G652 fiber. The examples 1 to 6 and 19 with three slices have average bending and microbending losses at a wavelength of 1,550 nm that are lower and therefore better than those of the examples 7 to 18 with four slices. On the other hand, the examples 7 to 18 with four slices have on average a higher effective area at 1,550 nm, which is better than that of the examples 1 to 6 and 19 with three slices.

There is claimed:

1. An optical fiber for wavelength division multiplex transmission networks, said fiber comprising, successively from its center toward its periphery, a core having a varying index profile and then a cladding having a constant index, said varying index profile of said core successively comprising, from said center toward said periphery, a central slice having a maximum index higher than the index of said cladding, a buried slice having a minimum index lower than the index of said cladding, and an annular slice having a maximum index higher than the index of said cladding and lower than the maximum index of said central slice, the ratio between the absolute value of the minimum index of said buried slice and the maximum index of said central slice being greater than 50%, the index of said central slice being at least 70% of the maximum index of said central slice at least one point less than 1 $\mu$m from the center of said optical fiber, the radii and the indices of each of the slices being determined so that said optical fiber has, at a wavelength of 1,550 nm, a chromatic dispersion from 4 ps/(nm*km) to 6 ps/(nm*km), a dispersion slope from 0.02 ps/(nm$^2$*km) to 0.04 ps/(nm$^2$*km) and, a chromatic dispersion to dispersion slope ratio less than 240 nm, and, a zero dispersion wavelength less than 1,460 nm and, an in-cable cut-off wavelength less than 1,450 nm.

2. The optical fiber claimed in claim 1 wherein said ratio between said absolute value of said minimum index of said buried slice and said maximum index of said central slice is from 60% to 90%.

3. An optical fiber for wavelength division multiplex transmission networks, said fiber comprising, successively from its center toward its periphery, a core having a varying index profile and then a cladding having a constant index, said varying index profile of said core successively comprising, from said center toward said periphery, a central slice having a maximum index higher than the index of said cladding, a first buried slice having a minimum index lower than the index of said cladding, an annular slice having a maximum index higher than the index of said cladding and lower than the maximum index of said central slice, and a second buried slice having a minimum index lower than the index of said cladding, the ratio between, firstly, the absolute value of the sum of the minimum index of said first buried slice and the minimum index of said second buried slice and, secondly, the maximum index of said central slice being greater than 50%, the index of said central slice being at least 70% of the maximum index of said central slice at least one point less than 1 $\mu$m from the center of said optical fiber, the radii and the indices of each of the slices being determined so that said optical fiber has at a wavelength of 1,550 nm, a chromatic dispersion from 4 ps/(nm*km) to 6 ps/(nm*km), a dispersion slope from 0.02 ps/(nm$^2$*km) to 0.04 ps/(nm$^2$*km), and, a chromatic dispersion to dispersion slope ratio less than 240 nm, and a zero dispersion wavelength less than 1,460 nm and an in-cable cut-off wavelength less than 1,450 nm, and wherein said first buried slice is buried deeper than said second buried slice.

4. The optical fiber claimed in claim 3 wherein a ratio between said absolute value of said minimum index of said first buried slice and said maximum index of said central slice is from 40% to 90%.

5. The optical fiber claimed in claim 3 wherein said maximum index of said annular slice is less than 3×10$^{-3}$.

6. The optical fiber claimed in claim 1 wherein the radii and the indices of each of said slices are determined so that said optical fiber has at the wavelength of 1,550 nm a dispersion slope from 0.025 ps/(nm$^2$*km) to 0.035 ps/(nm$^2$*km).

7. The optical fiber claimed in claim 1 wherein the radii and the indices of each of said slices are determined so that said optical fiber has at the wavelength of 1,550 nm a chromatic dispersion from 4.5 ps/(nm*km) to 5.5 ps/(nm*km).

8. The optical fiber claimed in claim 1 wherein the radii and the indices of each of said slices are determined so that said optical fiber has an in-cable cut-off wavelength less than 1,260 nm.

9. The optical fiber claimed in claim 1 wherein the radii and the indices of each of said slices are determined so that said optical fiber has at the wavelength of 1,460 nm a chromatic dispersion greater than 2 ps/(nm*km).

10. The optical fiber claimed in claim 1 wherein the radii and the indices of each of said slices are determined so that said optical fiber has a zero dispersion wavelength from 1,375 nm to 1,415 nm.

11. The optical fiber claimed in claim 1 wherein none of the slices has a plurality of index value plateaus as a function of the radius.

12. A transmission system for a transmission distance of less than 350 km, including at least one optical fiber as claimed in claim 1 and having no means for compensating chromatic dispersion of said optical fiber.

13. The transmission system claimed in claim 12 wherein the length of said optical fiber is greater than 1 km.

14. A combination of a metropolitan area transmission network for a transmission distance of less than 350 km and an access network, wherein said networks respectively comprise transmission optical fibers and access optical fibers and at least some transmission optical fibers and at least some access optical fibers are optical fibers as claimed in claim 8.

15. An optical fiber claimed in claim 1 wherein effective area at the wavelength of 1550 nm is greater than 50 $\mu m^2$.

16. An optical fiber claimed in claim 3 wherein effective area at the wavelength of 1550 nm is greater than 50 $\mu m^2$.

17. An optical fiber in claim 3, wherein the ratio between the absolute index of the minimum of the second buried slice and the maximum index of the central slice is less than 50%.

* * * * *